United States Patent [19]

Atteck

[11] 4,406,831

[45] Sep. 27, 1983

[54] MEAT PROTEIN PRODUCT AND PROCESS

[75] Inventor: Louis A. G. Atteck, Kenton, England

[73] Assignee: AMRAF Limited, London, England

[21] Appl. No.: 258,782

[22] Filed: Apr. 29, 1981

[51] Int. Cl.³ .............................. A23J 1/02; A23J 1/04
[52] U.S. Cl. .............................. 260/112 R; 426/574;
426/657; 426/437
[58] Field of Search .............. 426/574, 657, 480, 272,
426/437; 260/112 R

[56] References Cited

U.S. PATENT DOCUMENTS

| | | | |
|---|---|---|---|
| 2,742,456 | 4/1956 | Szent-Gyorgyi et al. | 260/112 R |
| 3,353,963 | 11/1967 | Podebradsky et al. | 426/480 X |
| 3,499,767 | 3/1970 | Schlamb | 426/272 |
| 3,594,190 | 7/1971 | Eslinger et al. | 426/480 X |
| 3,598,606 | 8/1971 | Spinelli | 260/112 R |
| 3,985,903 | 10/1976 | Hasegawa | 426/574 X |
| 4,062,409 | 12/1977 | Niki et al. | 426/657 X |
| 4,118,517 | 10/1978 | Niki et al. | 426/574 X |
| 4,181,749 | 1/1980 | Niki et al. | 426/574 X |
| 4,258,068 | 3/1981 | Huffman | 426/272 |
| 4,285,862 | 8/1981 | Murray et al. | 426/657 X |

FOREIGN PATENT DOCUMENTS 46-21774  6/1971  Japan ................................... 426/657
844979 of 0000 United Kingdom.

OTHER PUBLICATIONS

Altschul, A. M., New Protein Foods, vol. 1, Technology, Academic Press, N. Y., 1974, pp. 434–437.
Whitaker, J. R. et al., Food Proteins, AVI Publishing Co., Inc., Westport, Conn., 1977, pp. 122–129.

Primary Examiner—Robert A. Yoncoskie
Attorney, Agent, or Firm—Larson & Taylor

[57] ABSTRACT

A soluble meat protein product in the form of a dry protein powder or concentrated solution is produced from any meat muscle. The preferred route is via pre-rigor meat finely comminuted, in the presence of a solution of sodium chloride and food phosphate. The resulting slurry may be spray dried to produce a powder which is stable at ambient temperatures and from which can be prepared a solution with the property of forming strong gels on heating.

6 Claims, No Drawings

MEAT PROTEIN PRODUCT AND PROCESS

BACKGROUND OF THE INVENTION

This invention relates to the production of a soluble protein product from animal meat and to the product so produced.

It is known to produce a soluble material from meat by hydrolysis, this process breaking down the protein into smaller molecules such as peptides or amino acids, which are then dried to a powder for convenience of handling and storage. While these powders are readily soluble in water to be used to augment the meat content of a recipe and/or to add flavour, they have a limited value. In particular their ability to be used as a protein extender for the natural meat content of the recipe or a flavouring is restricted by the fact they are incapable of forming gels. To get the required gelling properties in meat recipes, comminution of good quality fresh meat in brine with added food phosphates will release soluble protein, but if for reasons of economy the quality of the meat or the processing time is reduced, the amount of soluble protein is very much reduced. Protein from other sources, e.g. soya protein isolates can also be used to give selling properties in processed meat products, but processed meat products, but in most instances legal requirements insist that these substances can only be used in addition to a minimum meat content of the final product.

SUMMARY OF THE INVENTION

It is an object of the present invention to provide a process for extracting soluble protein from animal meat for use as a meat substitute or equivalent while avoiding these disadvantages.

According to one aspect of the invention there is provided a process for the production of a soluble protein material from meat muscle, characterised in that the muscle protein is treated in a saline solution to dissolve lean meat protein in the solution and at least a part of the water content is removed to obtain soluble material that is capable of gelling when heated in solution.

In myofibrillar protein, which forms the predominant constituent of animal fibre, the largest constituent is myosin which is soluble in strong salt solutions and gels at about 50° C., while sarcoplasmic proteins, a lesser constituent of the meat muscle, is soluble in weak salt solutions and gels at about 37° C. It is therefore necessary to limit the maximum temperature of the solubilised product because if it is subjected to excessive heat, denaturation will take place and the material cannot afterwards be resolubilised to product a heat-setting gel. For this reason the maximum temperature reached by the material for any significant period during processing should be limited to less than 35° C.-40° C., and preferably it is not allowed to rise substantially above 25°-30° C. other than momentarily.

It is possible, for example to subject the material to a drying process such as spray-drying in which there is only brief exposure to a higher temperature, so that denaturation is not allowed to occur.

According to another aspect of the invention there is provided a concentrated meat protein product comprising soluble material meat protein, salt and comminuted insoluble meat protein, and having gelling properties in aqueous solution at temperatures above 50° C. The product may be produced in the form of a concentrated solution, but is preferably a powder.

DESCRIPTION OF THE PREFERRED EMBODIMENTS

In a preferred form of the process according to the invention, the muscle protein is finely divided while immersed in the treatment solution, and there results a mixture of solute-containing liquid and finely divided solids. This resulting protein mixture is concentrated to reduce bulk, for example to produce a powder, as by spray-drying, and in either case the product may include all or a part of the comminuted solids remaining from the process.

Any form of learn animal meat (this term including fish) can be used for the process according to the invention. The process is advantageously employed with pre-rigor meat, from which it is possible to extract the soluble protein relatively easily by chopping or comminuting the material in a solution of salt (sodium chloride) or salt and food phosphates (i.e. polymeric phosphates such as those commercially available under the trade names "Curaphos" and "Tari").

As meat muscle passes through rigor mortis chemical changes occur, and one significant reaction is the combination of actin and myosin present to form largely insoluble actomyosin, but post rigor meat can be processed according to the invention by suitable control of the process conditions although it will give a much smaller proportion of soluble protein. For example, to prepare a material with a limited quantity of insoluble protein and suitable for spray-drying, the meat muscle can be partially solubilised by slicing it thinly across the grain, or otherwise dividing the muscle fibres into very short lengths, in a solution of sodium chloride (salt) and food phosphate. The salt and phosphate are able to split the actomyosin at the exposed ends of the fibres into actin and myosin which will then go into solution. This is preferably done with a very slight agitation so as to allow a large part of the undissolved material to be separated more easily and allow diffusion of the water with salt and phosphate into the insoluble particles leaving a viscous protein solution containing a reduced concentration of salt and phosphate.

In the performance of the method according to the invention using pre-rigor meat, after slaughtering the animal it is hot-boned, i.e. meat is removed from the still-warm hung carcase, and after being trimmed of fat as far as is practical the meat muscle is chopped while immersed in the brine solution in any suitable comminuting or chopping apparatus, e.g. a bowl chopper, and a colloid mill can be used additionally to help effect solution. The action by which the meat protein passes into solution is limited mainly and is further influenced by a number of factors including the brine composition, temperature and pH value.

The composition of the brine solution will depend upon the type of meat muscle to be treated: in general relatively small quantities of food phosphate will be used because of the requirement to limit the quantities of such substances in the final product, and it is possible to omit phosphates from the solution completely for pre-rigor meat. For pre-rigor pork leg-meat, one suitable brine solution contains 7.5% sodium chloride and 0.16% food phosphate by weight in water. For pre-rigor beef, a rather higher sodium chloride content of 10.5% by weight is preferred in the brine, with the same 0.16% food phosphate addition. For fish, a still higher salt concentration is required, e.g. 12% with the same quantity of phosphates.

These solutions are able to treat half their own weight of lean meat which is comminuted in the solution in a conventional bowl chopper operating at 5000 rpm or higher. This ratio of brine to meat is chosen to obtain a solution of acceptable viscosity for spraying while limiting the liquid content in order to minimise the evaporation costs. The extraction of the soluble protein into solution is indicated by the formation of a thick, syrupy slurry with some thixotropic character in which the finely comminuted non-soluble material is suspended. During the process, the temperature of the mixture is kept to a maximum of preferably 25° C., and not more than 30° C. If required the slurry can be diluted with water or brine to reduce its viscosity before spray-drying but care must be taken to ensure this does not throw some protein out of solution.

The optimum spraying temperature parameters must be arrived at for each type of spray dryer as the residence time will differ considerably. As an example of the drying stage in a dryer having a downdraft chamber leading to a cyclone, the spray air inlet temperature may be 154° C. and the outlet temperature 64° C. The exposure of the slurry to these elevated temperatures is so brief (some few seconds) that the temperature reached by the solubilised products is well below the air temperature and they are heated for so short a time that there is no significant denaturation of the material that might make it insoluble.

It is possible to vary the contents of the treatment solution described above. As the amount of salt in the brine solution is reduced the gelling power of the product at 50° C. is reduced and there is more insoluble material present. For pre-rigor meat the salt concentrations given above can be reduced by about 2% (i.e. to 5.5% and 8.5% respectively) but further reduction may lead to undesirable results, although weak gels can still be obtained at salt concentrations of 4%: reduction of the phosphate content below 0.16% similarly results in weaker gel formation. The sodium chloride content can be increased to as much as 15% or more in each case although it will generally be undesirable to have such large quantities of salt in the final product.

In addition, the use of relatively large quantities of phosphates tends to produce too viscous a slurry which requires considerable dilution before spray drying. As that increases the process costs in addition to adding to the phosphate content of the product it is preferably avoided. The use of a brine without phosphates also appears to increase the solution viscosity undesirably however.

In the case of post-rigor meat, diffeent brine solutions with 5% sodium chloride and 5% food phosphates by weight may be used in a 2:1 mixture by weight of meat and brine solution: the sodium chloride concentration may be varied between 3% and 7% and the phosphate concentration may be varied between 3% and 5%. This process is preferably carried out at temperature below normal room temperature, e.g. about 5° C. In one method of procedure the meat is comminuted, e.g. using a bowl chopper. The fine slurry produced contains solubilised protein from the meat, but also a large quantity of non-soluble meat fibres. These fibres are sufficiently finely divided to be processed with the solution through a spray drying process if a powder is to be produced. This process, however, gives a very low proportion of soluble protein.

With the same brine solution, and similarly at a lowered temperature of about 5° C., post-rigor meat can also be processed by slicing the meat thinly across the grain before immersion to present a large area of fibre ends to the cold brine. The mixture is allowed to stand with no agitation or with only very mild agitation at intervals, for about 24 hours. The residual solids are then separated with the minimum of energy to prevent as much as possible of the soft surface of the meat from becoming dispersed in the solution. The yield of solution in this process amounts to about half the original quantity of brine and contains about 4–5% soluble protein with reduced quantities of salt and phosphates due to the absorption of these materials, with some water, into the remaining meat particles or slices. The solution is spray-dried or otherwise processed if required. The residual meat solids from the solution can be dried and used as a conventional extender in normal commercial products.

Both with pre-rigor and post-rigor meat ratios of brine to lean meat greater than 2:1 referred to above can be used but the process costs are increased because a greater mass of water must be evaporated to concentrate or dry the mixture. Smaller ratios are possible but undesirable because of the increase of viscosity of the mixture. Also, there is some risk of reducing the yield if the amount of solution is reduced excessively.

The final product from the processes described in the above examples will be a mixture of soluble protein with salt and phosphate (if this last constituent was in the brine), and also some finely divided insoluble meat fibres. The product in dry powder form can be mixed with the weight of water required to give a regenerated mass equivalent to lean meat, i.e. a weight ratio of 3:1 water to protein. In practice, however, the product is useful in diluted form.

Thus, where the solids are separated from the solution containing the solubilised protein as in the final example above, the product is capable of forming gels in very low concentrations when heated. For example, a mixture of some (three) 3% or more of the spray-dried soluble product by weight in water will give strong translucent gels on heating above 50° C.: with further heating beyond that temperature the gel clouds and stiffens as denaturation increases, similarly to the behaviour of fresh meat. However, if some proportion of insoluble fibres is present with the soluble extract, it is found that in certain applications these can reinforce the denatured gel and strengthen its bonding power.

The product has useful properties as a binder, an emulsifier and for the enhancement of succulence, texture and water-holding properties. It can in particular be used in all meat recipes and formulations as a replacement for all or a part of the high grade lean meat content because of the binding effect it has during cooking. For example, in a sausage meat recipe, the use of 4% by weight of the dried product (assuming one half of that is protein and the other half is salt and phosphates) will replace 8% by weight of lean meat, equal to one quarter of the lean meat content.

The product can moreover be used for treating the surfaces of large pieces of meat, and in cured or uncured whole meats such as ham and roast pork by adding it to the brine injected into the meat, to improve binding, water-holding and succulence. The material can also be used to produce reformed meat products and semi-analogues of meat in conjunction with vegetable-protein fibres. For all these uses, the invention is able to provide a product that can be supplied economically, is simple to use, has uniform properties and is stable at ambient temperatures.

While it is preferred to produce the material in the form of a powder for easier handling and freedom from bacteriological attack, it is also possible to produce it as concentrated viscous solution.

What is claimed is:

1. A process for the production of a protein material from pre-rigor meat muscle, comprising: treating the muscle protein in a saline solution to dissolve lean meat protein in the solution; and removing water by evaporation to obtain a dried powder product with soluble protein material, which material is capable of gelling when heated in aqueous solution.

2. A process according to claim 1 wherein the meat muscle is finely divided in said solution.

3. A process according to claim 1 wherein the step of removing the water comprises spray-drying.

4. A process according to claim 1 when the saline solution also contains a food phosphate.

5. A process according to claim 1 wherein the temperature of the water-soluble protein material is restricted substantially throughout to not more than 40° C.

6. A process according to claim 5 wherein the temperature of the water-soluble protein material while in solution is restricted to not more than 30° C.

* * * * *